(12) United States Patent
Nittou

(10) Patent No.: US 8,237,889 B2
(45) Date of Patent: Aug. 7, 2012

(54) BACKLIGHT DEVICE AND DISPLAY USING THE SAME

(75) Inventor: Eiji Nittou, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 246 days.

(21) Appl. No.: 12/531,207

(22) PCT Filed: Dec. 27, 2007

(86) PCT No.: PCT/JP2007/075090
§ 371 (c)(1),
(2), (4) Date: Sep. 14, 2009

(87) PCT Pub. No.: WO2008/139664
PCT Pub. Date: Nov. 20, 2008

(65) Prior Publication Data
US 2010/0110341 A1   May 6, 2010

(30) Foreign Application Priority Data

Apr. 17, 2007   (JP) .................................. 2007-107743

(51) Int. Cl.
    G02F 1/1335    (2006.01)
(52) U.S. Cl. ........................................................ 349/67
(58) Field of Classification Search .................... 349/67
    See application file for complete search history.

(56) References Cited

U.S. PATENT DOCUMENTS

| 4,735,482 A | 4/1988 | Yoshida et al. |
| 7,563,014 B2* | 7/2009 | Ogawa ........................... 362/628 |
| 2001/0010568 A1 | 8/2001 | Nakano |
| 2004/0021806 A1 | 2/2004 | Ohizumi et al. |
| 2006/0039164 A1* | 2/2006 | Takahashi ...................... 362/600 |
| 2006/0098455 A1* | 5/2006 | Yasuda et al. .................. 362/615 |

FOREIGN PATENT DOCUMENTS

| CN | 1470918 A | 1/2004 |
| JP | 3028865 U | 9/1996 |
| JP | 2001-281658 A | 10/2001 |
| JP | 2003-187625 A | 7/2003 |

* cited by examiner

Primary Examiner — Mark Robinson
Assistant Examiner — Charles Chang
(74) Attorney, Agent, or Firm — Birch, Stewart, Kolasch & Birch, LLP

(57) ABSTRACT

A backlight device in which a reflector can be easily taken in and out and can be efficiently replaced by preventing friction between a casing and the reflector from occurring when the reflector is assembled in the device and variation of optical characteristics after the assembling can be suppressed. In order to provide such a backlight device, the cross sectional shape of the reflector is gradually reduced in its inserting direction.

7 Claims, 6 Drawing Sheets

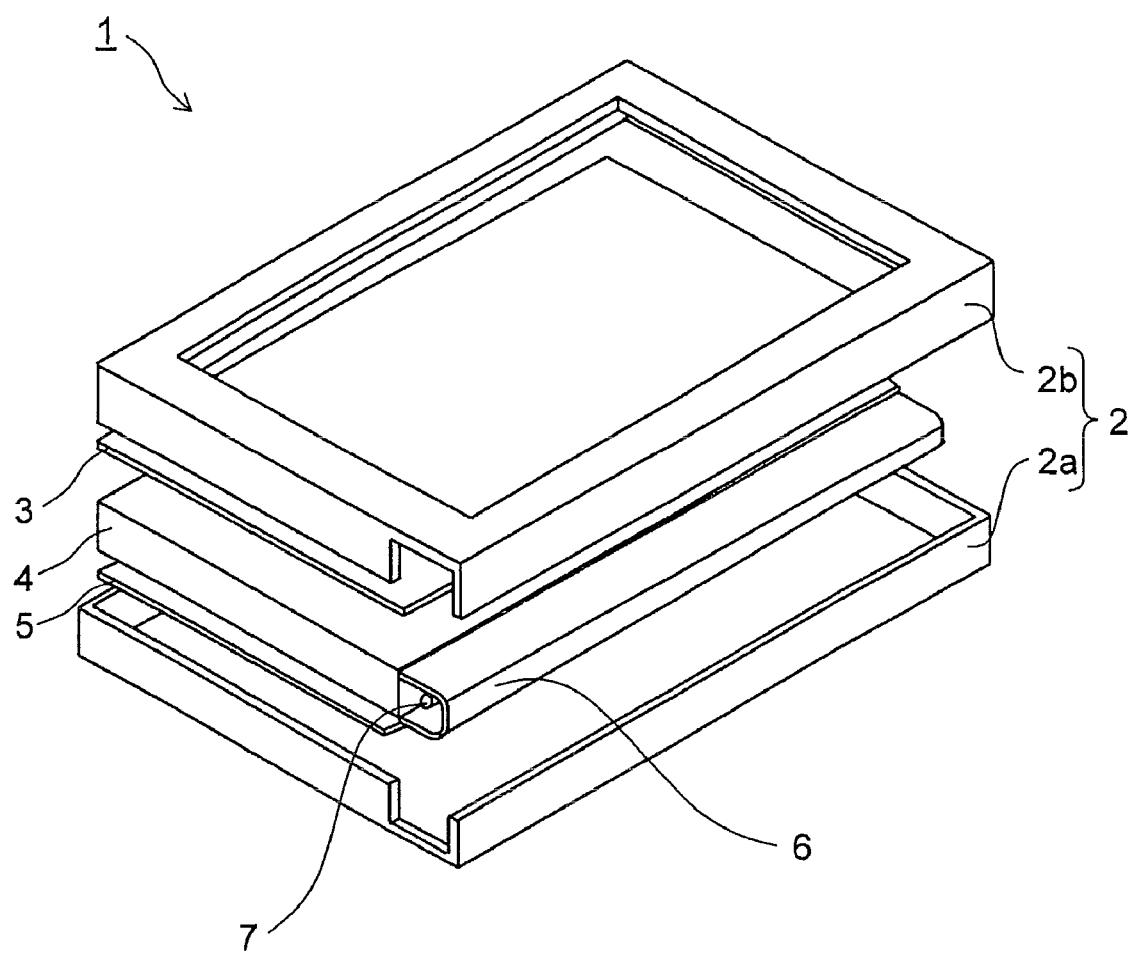

BACKLIGHT DEVICE AND DISPLAY USING THE SAME

TECHNICAL FIELD

The present invention relates to a backlight device, and more particularly to a technology that facilitates the assembling-in and replacement of a reflector including a light source in a backlight device.

BACKGROUND ART

In recent years, replacing cathode-ray tubes conventionally used as display devices, so called flat panel displays have become the mainstream and are expanding their market. Among others, liquid crystal display devices are slim, lightweight, power-saving, and high-definition, and are used in wide areas such as in television monitors, personal computers, digital still cameras, and cellular phones.

Here, a liquid crystal display device is typically composed of a liquid crystal module formed of a liquid crystal panel, having liquid crystal sealed between a pair of opposing electrode substrates, and a polarizing plate; a backlight device that illuminates the liquid crystal module from behind; and various circuit boards that are used for driving the liquid crystal module.

FIG. 5 is an exploded perspective view of an edge-lit backlight device 1 (hereinafter referred to as the backlight device 1). The backlight device 1 has a casing 2, formed by combining together a first frame 2a and a second frame 2b, that houses thereinside a reflective sheet 5, an optical sheet 5, a light guide plate 4, a linear light source 7, and a reflector 6 that houses thereinside the linear light source 7.

Here, the optical sheet 3 has a diffusion sheet and a light-condensing sheet laid together, and is disposed on the top surface of the light guide plate 4. The reflective sheet 5 is disposed on the bottom surface of the light guide plate 4. The linear light source 7 is disposed at a position facing a side surface of the light guide plate 4. In addition, the linear light source 7 has its opposite ends held, by holding members (unillustrated), inside the reflector 6. The light guide plate 4 and the reflector 6 are held in a predetermined position by being sandwiched between the first frame 2a and the second frame 2b from above and below.

FIG. 6 is a perspective view of the backlight device 1 shown in FIG. 5. In the backlight device 1, light emitted from the linear light source 7 enters the light guide plate 4 through a side surface thereof and repeats irregular reflection to pervade the whole light guide plate 4, is then reflected upward from the reflective sheet 5 disposed on the bottom surface of the light guide plate 4 to exit the light guide plate 4 through its top surface, and then passes through the optical sheet 3, to illuminate a liquid crystal panel (unillustrated) evenly.

Here, the reflector 6 reflects the light from the linear light source 7 towards the light guide plate 4 to lead the light into the light guide plate 4. For replacement of the linear light source 7 housed inside the reflector 6, there is generally known a method of replacement which involves taking out the linear light source 7 together with the reflector 6 from the casing 2.

An insertion opening 8 is generally formed in a side wall of the casing 2 of the backlight device 1. By sliding and thereby pulling out the reflector 6 through the insertion opening 8 in the direction indicated by an arrow in the diagram, it is possible, without disassembling the backlight device 1, to take out a reflector 6 part alone. In addition, by inserting one end of the reflector 6 through the insertion opening 8 and sliding it into the space between a side surface of the light guide plate 4 and a side wall of the casing 2, it is possible to assemble the reflector 6 into the casing 2.

Here, with a view to suppressing variations in optical characteristics of the backlight device 1 and achieving compactness and slimness of the device as a whole, generally, in the space between the side surface of the light guide plate 4 and the side wall of the casing 2, only a free space for housing the reflector 6 is provided and almost no extra clearance is provided. Thus, in the course of sliding the reflector 6, friction occurs between the casing 2 and the reflector 5. This makes it difficult to take out and insert the reflector 6, lowering the efficiency of the assembling-in and replacement of the reflector.

To solve the above problem, there is conventionally proposed (Patent Document 1 listed below) a device in which a predetermined clearance is provided between a casing and a reflector and in which the reflector is held inside the casing by parts of lamp rubbers, provided at the opposite ends of the reflector, that project outward from the outer circumferential surface of the reflector.

Patent Document 1: JP-A-2001-281658 Publication

DISCLOSURE OF THE INVENTION

Problems to be Solved by the Invention

The invention disclosed in Patent Document 1 is for improving replacement efficiency of the reflector by preventing friction between the casing and the reflector. The invention, however, has a disadvantage that, since a predetermined clearance is provided, variations in optical characteristics occur.

In view of the foregoing, an object of the present invention is to provide a backlight device that prevents friction between a casing and a reflector from occurring when the reflector is assembled into the device so that the reflector can be easily taken out and inserted and thus can be efficiency replaced, and that in addition suppresses variation in optical characteristics after the assembly.

Means for Solving the Problem

To achieve the above object, in the structure according to the present invention, in a backlight device used in a liquid crystal display device, the sectional shape of a reflector that houses a light source is so formed as to be increasingly small in the direction in which the reflector is inserted with respect to an insertion opening provided in the backlight device.

Moreover, in the invention, the reflector has a top plate, a side plate, and a bottom plate connected together so as to have a substantially square-cornered C sectional shape, the top plate, the side plate, and the bottom plate being substantially rectangular. The top plate is inclined in the direction in which the reflector is inserted with respect to the bottom plate.

Moreover, in the invention, a reflector rubber formed of resin is provided at an edge part of the reflector.

Moreover, the invention is a display device provided with a backlight device having the structure described above and a liquid crystal module.

Advantages of the Invention

In a first structure according to the present invention, the sectional shape of a reflector is so formed as to be increasingly small in the direction in which the reflector is inserted. Thus, when inserting the reflector, with the end having a smaller sectional shape at the front, into a backlight device through an insertion opening, a small clearance is created between the inner surface of a casing of the backlight device and the outer surface of the reflector. This makes it possible to prevent friction from occurring on the outer surface of the reflector and thus to easily take out and insert the reflector through the insertion opening. Thus, it is possible to efficiently replace a light source housed in the reflector.

In addition, the clearance created between the inner surface of the casing and the outer surface of the reflector can be adjusted by the shape of the reflector. Thus, by designing the reflector such that the clearance is a requisite minimum, it is possible to keep variations in optical characteristics to a minimum.

In a second structure according to the invention, a top plate, a side plate, and a bottom plate are connected together so as to have a substantially square-cornered C sectional shape, the top plate, the side plate, and the bottom plate being substantially rectangular. When the reflector that has the top plate inclined in the direction in which the reflector is inserted with respect to the bottom plate is inserted into the casing through the insertion opening, by utilizing the clearance created between the inner surface of the casing and the top plate, it is possible to prevent friction from occurring between the outer surface of the reflector and the inner surface of the casing. Thus, it is possible to facilitate the assembling-in of the reflector, and in addition to suppress variation in optical characteristics.

In a third structure according to the invention, a reflector rubber formed of resin is provided at an edge part of the reflector. This makes it possible to prevent the edge part of the reflector from rubbing and thereby scratching the inner surface of the casing when the reflector is inserted into the casing.

In a fourth structure according to the invention, it is possible to provide a liquid crystal display device provided with a backlight device that has the characteristics described above.

BRIEF DESCRIPTION OF DRAWINGS

[FIG. 1] is an exploded perspective view of a backlight device according to a first embodiment of the present invention.

LIST OF REFERENCE SYMBOLS

Figure 2A:
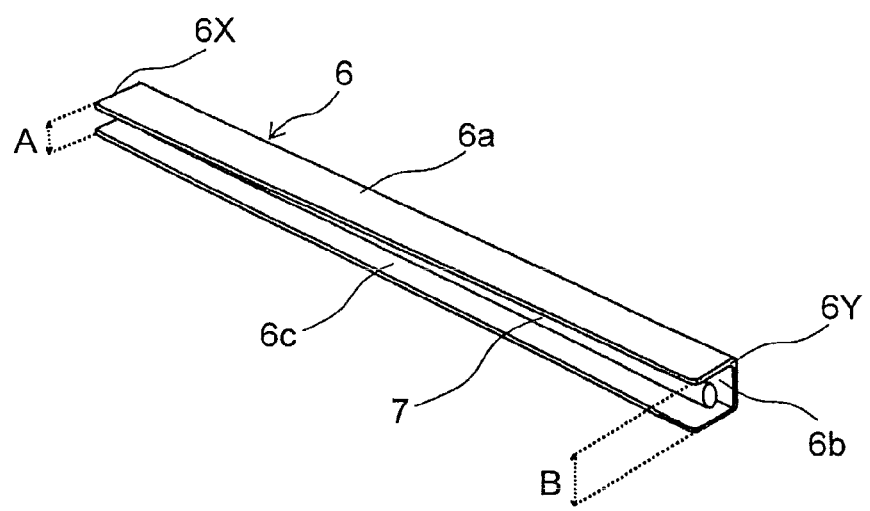
[FIG. 2] (a) is a perspective view of a reflector according to the first embodiment, and (b) is a side view showing the reflector according to the first embodiment from the side a linear light source is housed.

1 Backlight device
2 Casing
2a First frame
2b Second frame
3 Optical sheet
4 Light guide plate
5 First frame
6 Reflector
6X Front-end part
6Y Rear-end part
6a Top plate
6b Side plate
6c Bottom plate
7 Linear light source
8 Insertion opening
9 Reflector rubber

BEST MODE FOR CARRYING OUT THE INVENTION

Figure 5:
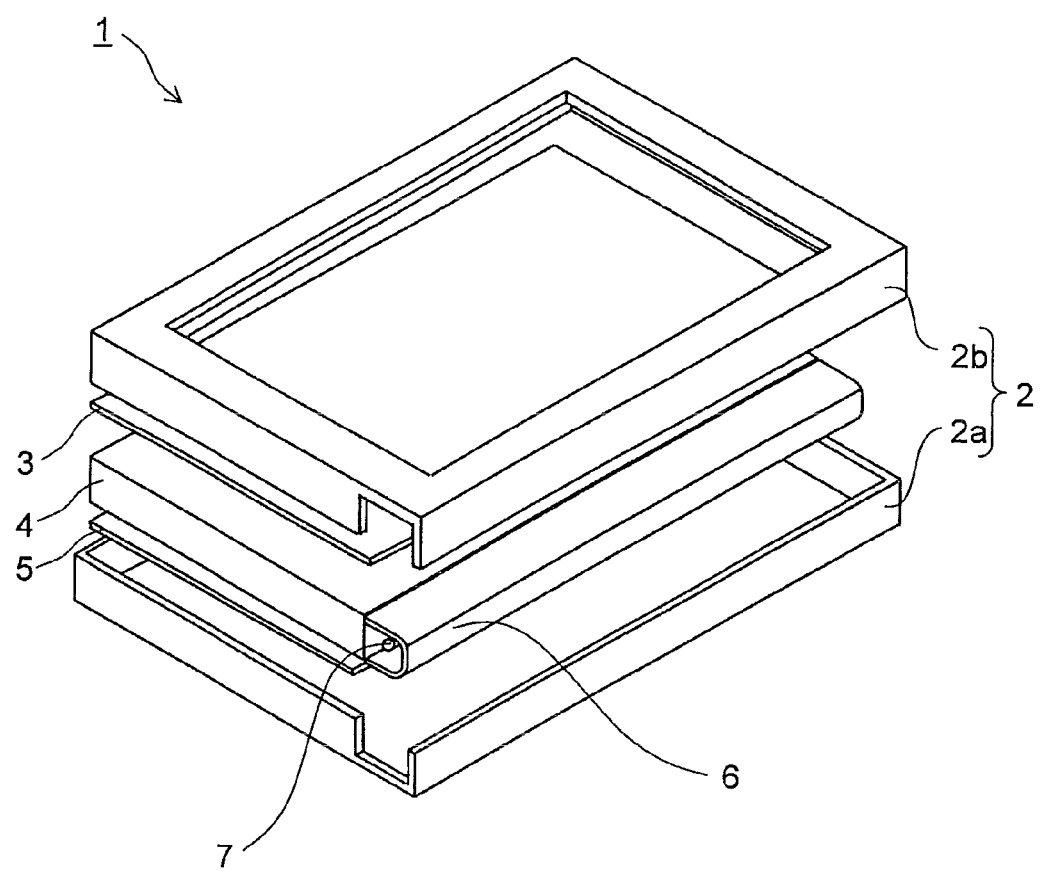
[FIG. 5] is an exploded perspective view showing a conventional edge-lit backlight device.
Figure 6:
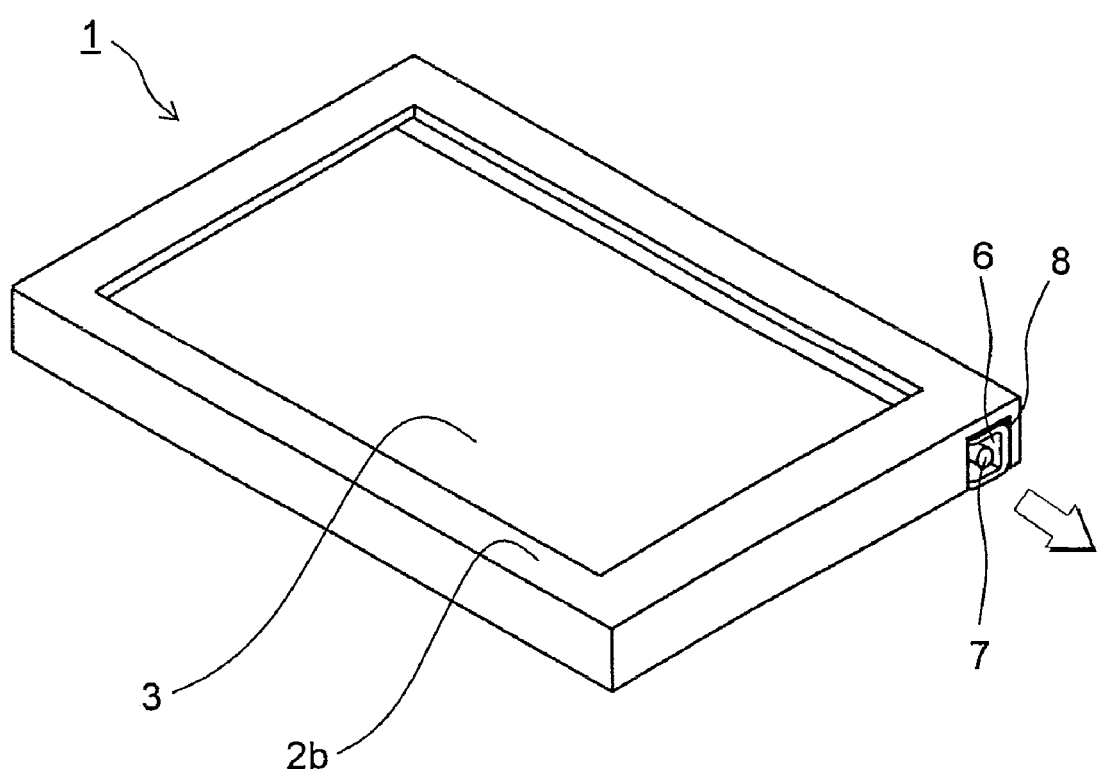
[FIG. 6] is a perspective view showing the conventional edge-lit backlight device.

Embodiments of the present invention will be now described with reference to the accompanying drawings. Such parts as find their counterparts in conventional examples in FIGS. 5 and 6 are identified by common reference signs, and no description of them will be repeated.

[First Embodiment]

FIG. 1 is an exploded perspective view of a backlight device 1 according to this embodiment. In the backlight device 1 according to this embodiment, as in the conventional example shown in FIG. 5, a reflector 6 housing a linear light source 7 is disposed on a side surface of a light guide plate 4 having an optical sheet 3 and a reflective sheet 5 laid on its top and bottom surfaces, respectively. These are housed inside a casing 2 formed by combining together a first frame 2a and a second frame 2b. In addition, in the casing 2, an insertion opening 8 is formed by open parts provided in side surfaces of the first frame 2a and the second frame 2b. The reflector 6 is taken out and inserted through the insertion opening 8 to perform replacement of the linear light source 7 (see the arrow shown in FIG. 6).

Here, the light guide plate 4 emits the light from the linear light source 7 to change the light path of the light entered the light guide plate 4 through the side surface thereof, so that the light is transformed into light having optical distribution in a planar light source form. The light guide plate 4 is polycarbonate, acrylic resin, or the like molded and processed into a plate of a wedge-shape or parallel-plate type.

Although a cold-cathode tube is used as the linear light source 7, it is also possible to use a discharge tube formed out of a hot-cathode tube or a xenon tube, other than a cold-cathode tube.

The reflective sheet 5 is formed out of a single, flexible, white resin sheet, or of such a sheet with highly-reflective reflective layer—having silver, aluminum, or the like vapor-deposited thereon—, laid on it. This makes the light from the light guide plate 4 to efficiently reflect towards a liquid crystal panel.

The optical sheet 3 is a diffusion sheet and a plurality of light-condensing sheets laid together. The diffusion sheet has fine asperities formed on one surface, to diffuse the light emitted from the light guide plate 4 in a random fashion. The top surface of the light-condensing sheet is a prism surface, which enhances brightness towards the liquid crystal panel.

Figure 2B:
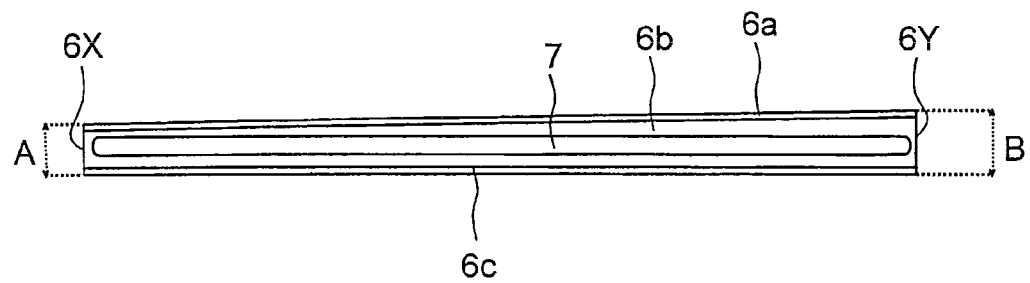

FIG. 2A is a perspective view of the reflector 6 according to this embodiment; FIG. 2B is a side view showing the reflector 6 from the side the linear light source 7 is housed. The reflector 6 is a reflective member formed out of a metal plate, such as an aluminum plate, that can be sheet metal processed, and has a top plate 6a, a side plate 6b, and a bottom plate 6c connected together so as to have a square-cornered C section. The reflector 6 houses the linear light source 7 thereinside and holds its opposite ends with holding members (unillustrated).

The top plate 6a of the reflector 6 is not parallel to the bottom plate 6c but is gently inclined in the direction in which the reflector 6 is inserted. Specifically, a height A of the outer perimeter at one end part (hereinafter referred to as the front-end part 6X) of the reflector 6 is formed to be lower than a height B of the outer perimeter at the other end part (hereinafter referred to as the rear-end part 6Y).

Figure 3A:
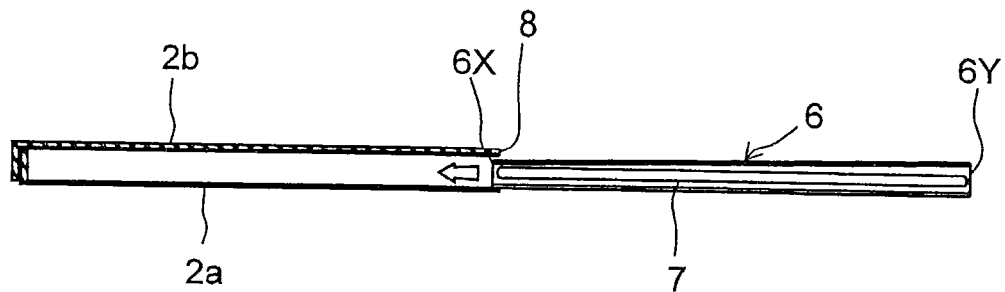
[FIG. 3] (a) is a sectional view showing the process of inserting the reflector in the backlight device according to the first embodiment, (b) is a sectional view showing the state in which a front-end part of the reflector according to the first embodiment is inserted in an insertion opening, and (c) is a sectional view showing the reflector according to the first embodiment in its state inserted so far that its rear-end part is close to the insertion opening.
Figure 3B:
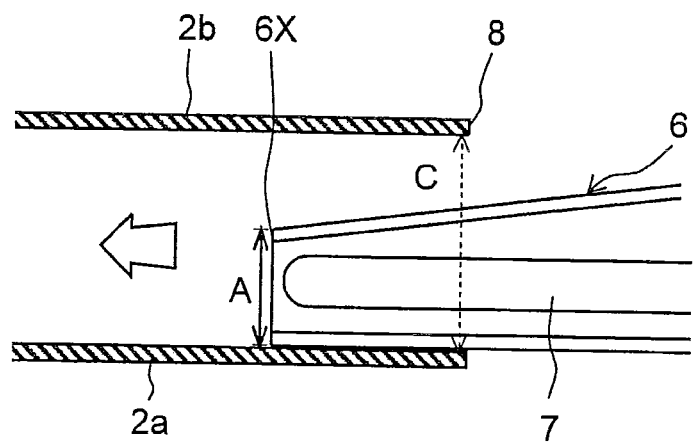
Figure 3C:
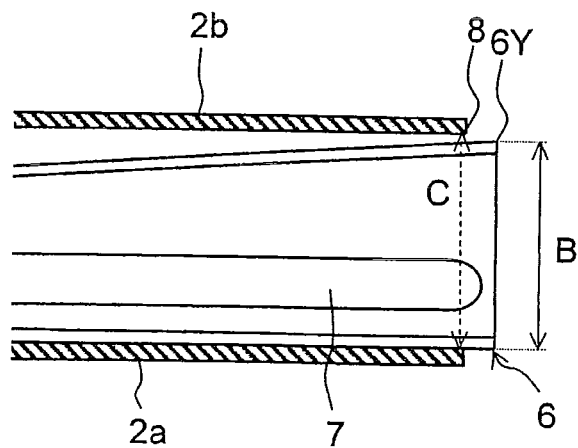

FIG. 3A is a sectional view showing the process of inserting the reflector 6 into the backlight device 1. FIGS. 3B and 3C are enlarged sectional views showing near the insertion opening 8 formed by the frames. FIG. 3B shows the state of the front-end part 6X of the reflector 6 inserted in the insertion opening 8; FIG. 3C shows the reflector 6 in its state inserted so far that its rear-end part 6Y is close to the insertion opening 8.

Here, a height C of the inner perimeter of the casing 2 is substantially equal to the height B of the outer perimeter of the rear-end part 6Y, and the height A of the outer perimeter of the front-end part 6X is lower than the height C of the inner perimeter of the casing 2. Thus, the front-end part 6X of the reflector 6 can be easily inserted into the insertion opening 8 (see FIG. 3B). Moreover, since the top plate 6a of the reflector 6 is inclined from the front-end part 6X to the rear-end part 6Y, a predetermined clearance is created between the inner surface of the second frame 2b and the outer surface of the top plate 6a. By inserting the reflector 6 inside the casing 2 while avoiding friction between the outer surface of the reflector 6 and the inner surface of the casing 2 by utilizing this clearance, it is possible to insert the reflector 6 smoothly. Similarly, when pulling out the reflector 6, it is possible to pull out the reflector 6 smoothly from the casing 2 by utilizing this clearance.

The height of the outer perimeter of the rear-end part 6Y of the reflector 6 is substantially equal to the height of the inner perimeter of the insertion opening 8. Thus, when the reflector 6 is slid and thereby inserted into the frame and when the rear-end part 6Y reaches close to the insertion opening 8, the outer circumferential surface of the rear-end part 6Y fits into the inner circumferential surface of the insertion opening 8 so that the reflector 6 is held and fixed inside the frames (see FIG. 3C). Thus, it possible to prevent light leakage from this part and thus to prevent lowering in brightness.

Since the top plate 6a of the reflector 6 is inclined, the area of a light-emission opening of the reflector 6 decreases towards the front-end part 6X. However, the difference between the heights of the rear-end part 6Y and the front-end part 6X is negligibly minute with respect to the area of the light-emission opening. Thus, it is possible to neglect the lowering in brightness due to the inclination of the top plate 6a of the reflector 6.

The clearance created between the casing 2 and the reflector 6 due to the inclination of the top plate 6a of the reflector 6 is a minimum clearance required for facilitating the sliding and inserting of the reflector 6; thus, it is possible to neglect variations in optical characteristics due to this clearance.

[Second Embodiment]

In this embodiment, such parts as find their counterparts in conventional examples and the first embodiment are identified by common reference signs, and no description of them will be repeated. In a backlight device 1 according to this embodiment, as in the conventional example shown in FIG. 6, a reflector 6 that houses a linear light source 7 is disposed on a side surface of a light guide plate 4 having an optical sheet 3 and a reflective sheet 5 laid on its top and bottom surfaces, respectively. These are housed inside a casing 2 formed by combining together a first frame 2a and a second frame 2b. In addition, an insertion opening 8 is formed by open parts provided in side surfaces of the first frame 2a and the second frame 2b, and the reflector 6 can be taken out and inserted through the insertion opening 8.

Figure 4A:
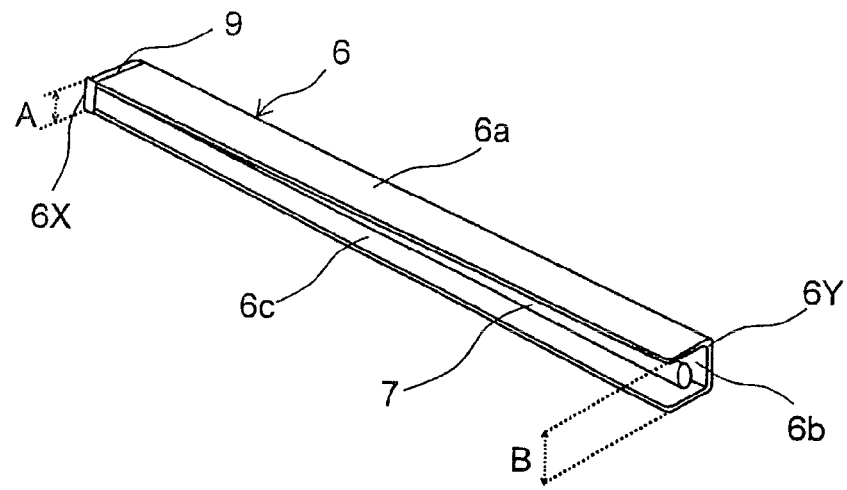
[FIG. 4] (a) is a perspective view of a reflector according to a second embodiment of the present invention, and (b) is a side view showing the reflector according to the second embodiment from the side a linear light source is housed.
Figure 4B:
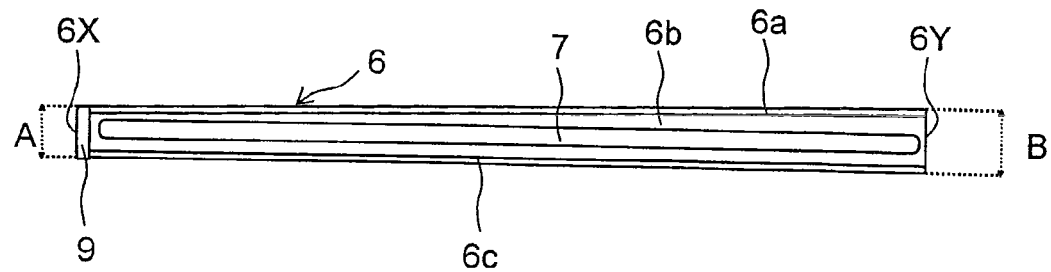

FIG. 4A is a perspective view of the reflector 6 according to this embodiment; FIG. 4B is a side view showing the reflector 6 from the side facing the side surface of the light guide plate 4. The reflector 6 according to this embodiment, like the reflector 6 according to the first embodiment, is a reflective member formed out of a metal plate, and has a top plate 6a, a side plate 6b, and a bottom plate 6c are connected together so as to have a square-cornered C section. The reflector 6 houses the linear light source 7 thereinside and holds its opposite ends with holding members (unillustrated). In addition, the top plate 6a of the reflector 6 is not parallel to the bottom plate 6c but is gently inclined in the direction in which the reflector 6 is inserted, and in addition a reflector rubber 9 is provided at an edge part of the front-end part 6X.

Here, the reflector rubber 9 is formed of a synthetic resin such as silicon, and is so provided as to cover an edge part of the metallic reflector 6. By the reflector rubber 9, when inserting while sliding the reflector 6 into the frame 5, it is possible to prevent the inner surfaces of the first frame 2a and the second frame 2b from being rubbed and thereby scratched by the edge part of the front-end part 6X. Note that by applying coating treatment for reducing frictional resistance on the surfaces of the reflector rubber 9 and the reflector 6, it is possible to make inside the frame more slidable, and thus to further improve the efficiency of replacement of the reflector 6.

Even when the reflector rubber 9 is provided, a height A of the outer perimeter of the front-end part 6X is formed lower than a height C of the inner perimeter of the casing 2, which makes it possible to easily insert the front-end part 6X into the insertion opening 8. Moreover, when sliding the reflector 6 inside the frame to insert it as in the first embodiment, since the top plate 6a of the reflector 6 is inclined from the front-end part 6X to the rear-end part 6Y, a clearance is created between the second frame 2b and the top plate 6a; thus, it is possible to prevent friction from occurring between the frame and the reflector 6, allowing the reflector 6 to be smoothly inserted into and pulled out from the casing 2.

Since the top plate 6a of the reflector 6 is inclined, the area of a light-emission opening of the reflector 6 decreases towards the front-end part 6X. However, the difference between the heights of the rear-end part 6Y and the front-end part 6X is negligibly minute with respect to the area of the light-emission opening. Thus, it is possible to neglect the lowering in brightness due to the inclination of the top plate 6a of the reflector 6. In addition, the reflector rubber 9 is provided at the edge of the reflector 6 so that the rubber does not block the light traveling from the linear light source 7; thus, it is possible to neglect the lowering in brightness and variations in optical characteristics.

It is to be understood that the embodiments described above are not meant to limit the present invention, which allows many variations and modifications, and embodiments achieved by combining together technical features disclosed in different embodiments also fall within the technical scope of the invention. For example, although the above-described embodiments deal with the reflector 6 having a shape in which the top plate 6a, the side plate 6b, and the bottom plate 6c are connected together so as to have a square-cornered C section and in which the top plate 6a is inclined, this is not meant to limit the invention; the bottom plate 6c may be inclined, or the side plate 6b may be inclined. Moreover, all the plates may be inclined from the rear-end part 6Y to the front-end part 6X to form a taper.

The reflector rubber 9 may not only be fitted to the front-end part 6X of the reflector 6 but may also be provided at an edge part of the rear-end part 6Y. Here, the reflector rubber 9 provided on the outer circumferential surface of the rear-end part 6Y fits into the inner circumferential surface of the insertion opening 8 more steadily, allowing the reflector 6 to be held and fixed steadily inside the frames.

Use of the reflector 6 is not limited to cases where it is provided only on one side surface of the light guide plate 4; the reflector 6 according to the present invention may be used also in backlight devices of the type in which the reflector 6 is provided one on each of opposite side surfaces of the light guide plate 4 so that this is illuminated from opposite sides by the linear light source 7.

Industrial Applicability

The present invention can be utilized in edge-lit liquid crystal display devices. The invention can also be used in liquid crystal displays employing such an edge-lit liquid crystal display device.

The invention claimed is:

1. A backlight device used in a liquid crystal display device, wherein in a housing of the backlight device, a reflector insertion opening is formed through which a reflector that houses a light source is put in and taken out, in a direction in which the reflector is inserted into the reflector insertion opening, a height of an outer perimeter of a front-end part of the reflector is smaller than a height of an inner perimeter of the reflector insertion opening, and a height of an outer perimeter of a rear-end part of the reflector is substantially equal to the height of the inner perimeter of the reflector insertion opening, the reflector has a top plate, a side plate, and a bottom plate connected together so as to have a substantially square-cornered C sectional shape, the top plate, the side plate, and the bottom plate being substantially rectangular, and the top plate is inclined in the direction in which the reflector is inserted with respect to the bottom plate.

2. The backlight device according to claim 1, wherein the light source is a linear light source that extends in one direction, and when the reflector is inserted into the casing of the backlight device, the light source is arranged parallel to a side surface of the casing.

3. The backlight device according to claim 1, wherein a reflector rubber formed of resin is provided at an edge part of the reflector.

4. A display device comprising the backlight device according to claim 1 and a liquid crystal module.

5. The backlight device according to claim 2, wherein a reflector rubber formed of resin is provided an edge part of the reflector.

6. A display device comprising the backlight device according to claim 2 and a liquid crystal module.

7. A display device comprising the backlight device according to claim 3 and a liquid crystal module.

* * * * *